(12) United States Patent
Zenz

(10) Patent No.: US 8,322,368 B2
(45) Date of Patent: Dec. 4, 2012

(54) SELF SEALING DISCONNECT VALVE

(75) Inventor: Zac D. Zenz, St. Petersburg, FL (US)

(73) Assignee: Conax Florida Corporation, St. Petersburg, FL (US)

( * ) Notice: Subject to any disclaimer, the term of this patent is extended or adjusted under 35 U.S.C. 154(b) by 596 days.

(21) Appl. No.: 12/486,508

(22) Filed: Jun. 17, 2009

(65) Prior Publication Data

US 2009/0314978 A1    Dec. 24, 2009

Related U.S. Application Data

(60) Provisional application No. 61/073,523, filed on Jun. 18, 2008.

(51) Int. Cl.
*F16L 37/32* (2006.01)

(52) U.S. Cl. ......... 137/614.02; 137/614.05; 137/614.06; 251/250

(58) Field of Classification Search ............. 137/614.02, 137/614.05, 614.06; 251/250
See application file for complete search history.

(56) References Cited

U.S. PATENT DOCUMENTS

| | | | | |
|---|---|---|---|---|
| 4,073,472 A | * | 2/1978 | Chasey | 251/229 |
| 5,305,776 A | * | 4/1994 | Romano | 137/68.14 |
| 5,351,708 A | * | 10/1994 | Donato et al. | 137/68.14 |
| 5,738,143 A | * | 4/1998 | Faughn | 137/614.03 |
| 7,131,458 B2 | * | 11/2006 | Kohda | 137/614.03 |
| 2004/0094738 A1 | * | 5/2004 | Noble et al. | 251/149.1 |

* cited by examiner

Primary Examiner — Craig Schneider
Assistant Examiner — Ian Paquette
(74) Attorney, Agent, or Firm — GrayRobinson, P.A.; Michael J. Colitz, III

(57) ABSTRACT

Disclosed is a self sealing disconnect for use in connection with an environmental control system. The disconnect includes two mating halves each of which houses an internal butterfly valve. When the halves are engaged, the butterfly valves are opened to complete a fluid circuit. Conversely, when the halves are disengaged, the butterfly valves are close so as to prevent the flow of fluids.

7 Claims, 6 Drawing Sheets

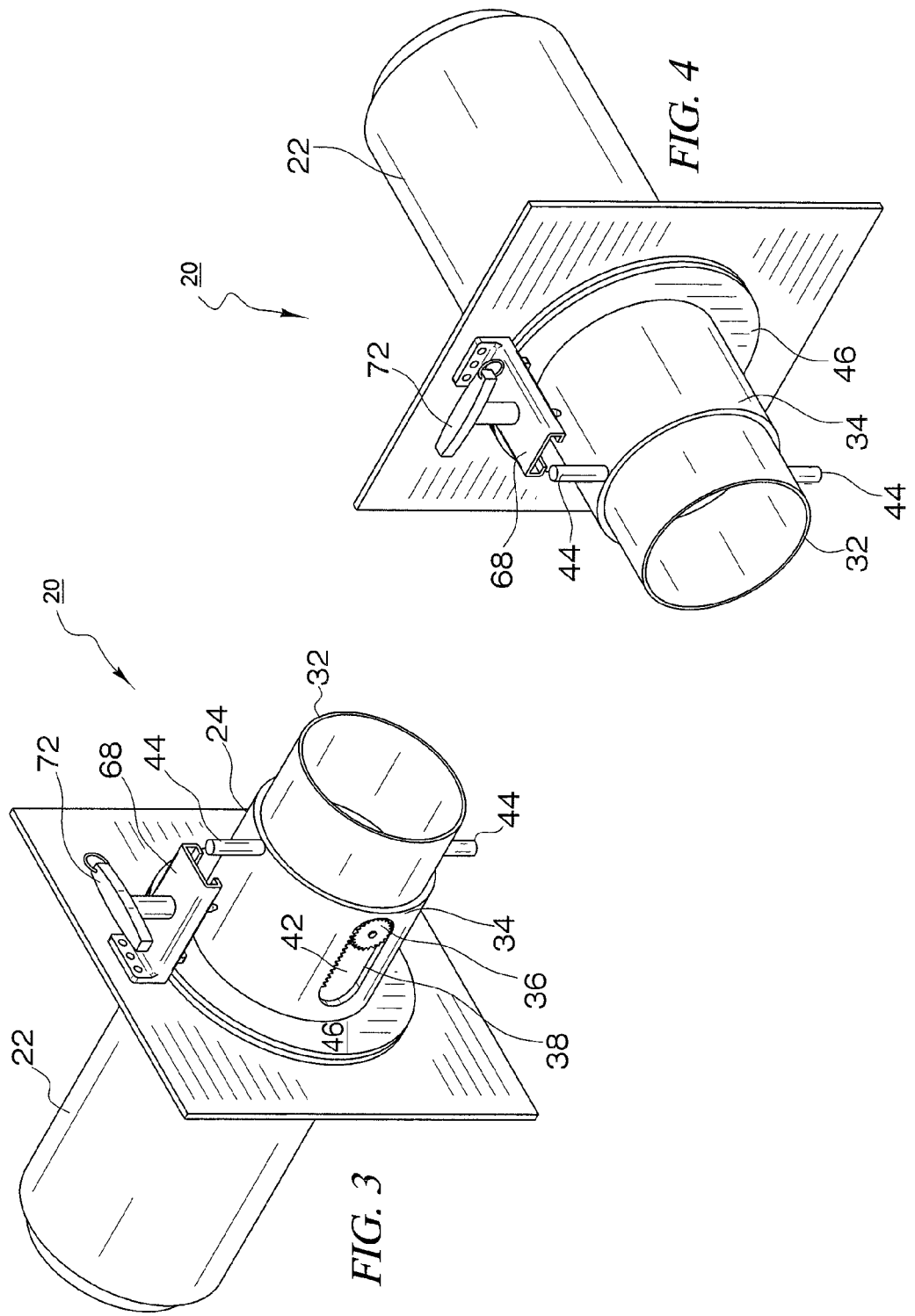

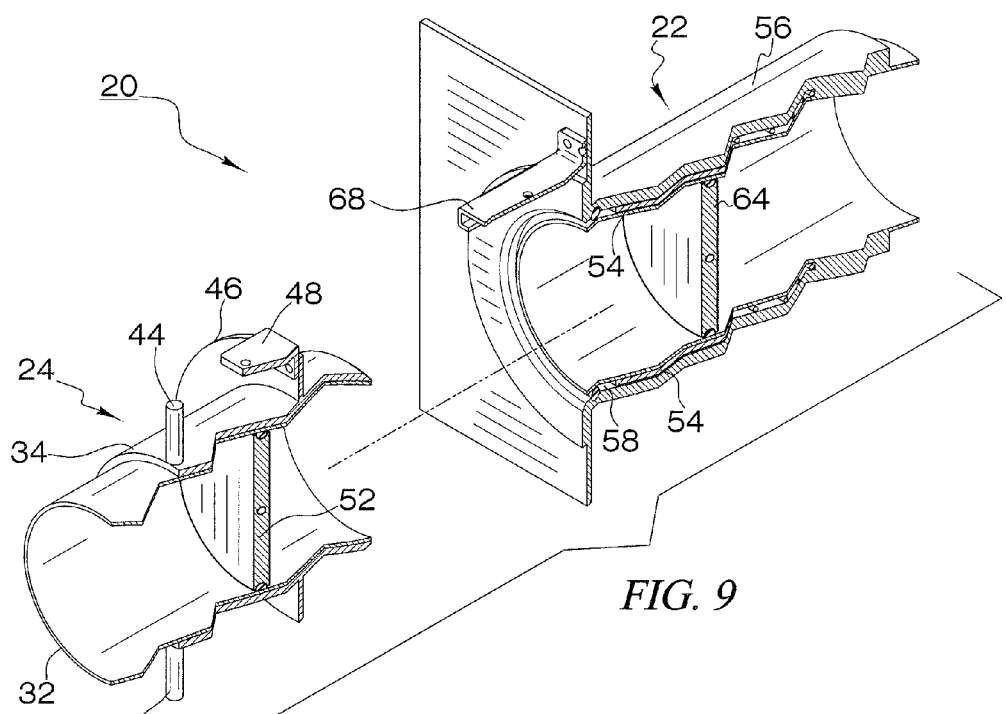
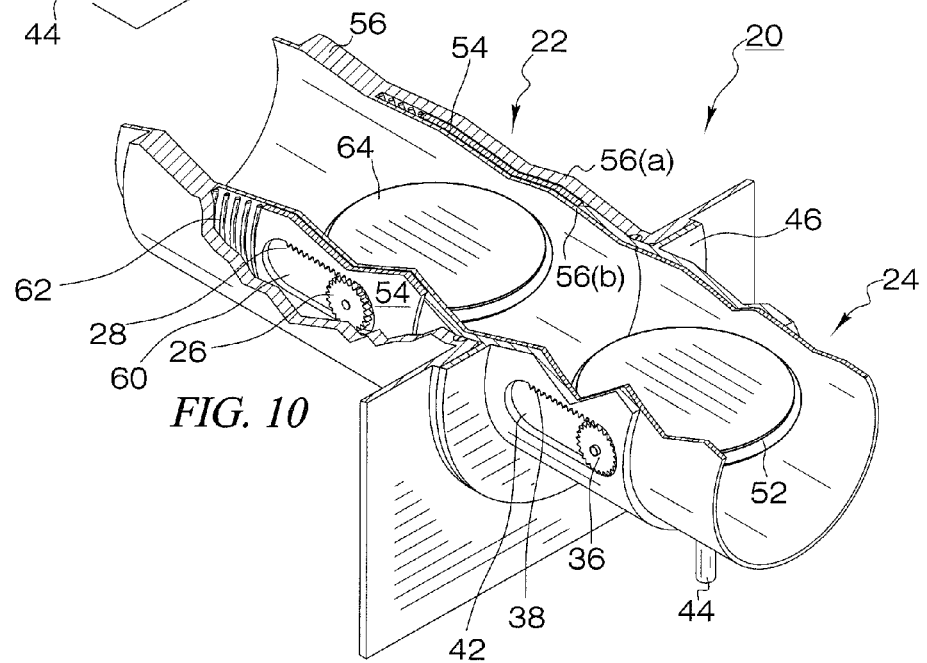

SELF SEALING DISCONNECT VALVE

RELATED APPLICATION DATA

This application claims priority to co-pending application Ser. No. 61/073,523 filed on Jun. 18, 2008 and entitled "Self Sealing Disconnect for Environmental Control System." The contents of this co-pending application are fully incorporated herein.

BACKGROUND OF THE INVENTION

1. Field of the Invention

This invention relates to a self sealing disconnect for valve. More particularly, the present invention relates to a self sealing disconnect for an environmental control system that employs rack and pinion activated butterfly valves.

2. Description of the Background Art

The background art contains various examples of butterfly-type valves that are used to selectively permit or preclude the flow of fluids, such as air. Although these valves are useful for certain applications, none provide the functionality afforded by the disconnect of the present invention.

SUMMARY OF THE INVENTION

It is therefore one of the objectives of the present invention to provide a self sealing disconnect valves.

It is another objective of this invention to provide a two part disconnect, wherein the two halves can be selectively mated to complete a fluid circuit.

It is yet another objective of this invention to provide a two part disconnect wherein each half includes an independently activated butterfly valve.

It is another object of this invention to provide a two part disconnect wherein fluid flow is permitted when the two parts are coupled and wherein fluid flow is precluded when the two parts are uncoupled.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3 is a perspective view of the self sealing disconnect valve in the engaged orientation.

FIG. 4 is a perspective view of the self sealing disconnect valve in the engaged orientation.

FIG. 9 is a partial sectional view of the self sealing disconnect valve in the disengaged orientation and with the associated valves fully closed.

FIG. 10 is a partial sectional view of the self sealing disconnect valve in the engaged orientation and with the associated valves fully opened.

Similar reference characters refer to similar parts throughout the several views of the drawings.

DETAILED DESCRIPTION OF THE PREFERRED EMBODIMENT

The present invention relates to self sealing disconnect valve. The valve includes two mating halves, each of which houses an internal valve. When the two halves are fully engaged, the valves are pivoted to an opened orientation to complete a fluid circuit. Conversely, when the two halves are disengaged, the valves are pivoted to a closed orientation so as to prevent fluid flow. A locking flange is included such that the two halves can be maintained in the engaged orientation.

Figure 1:
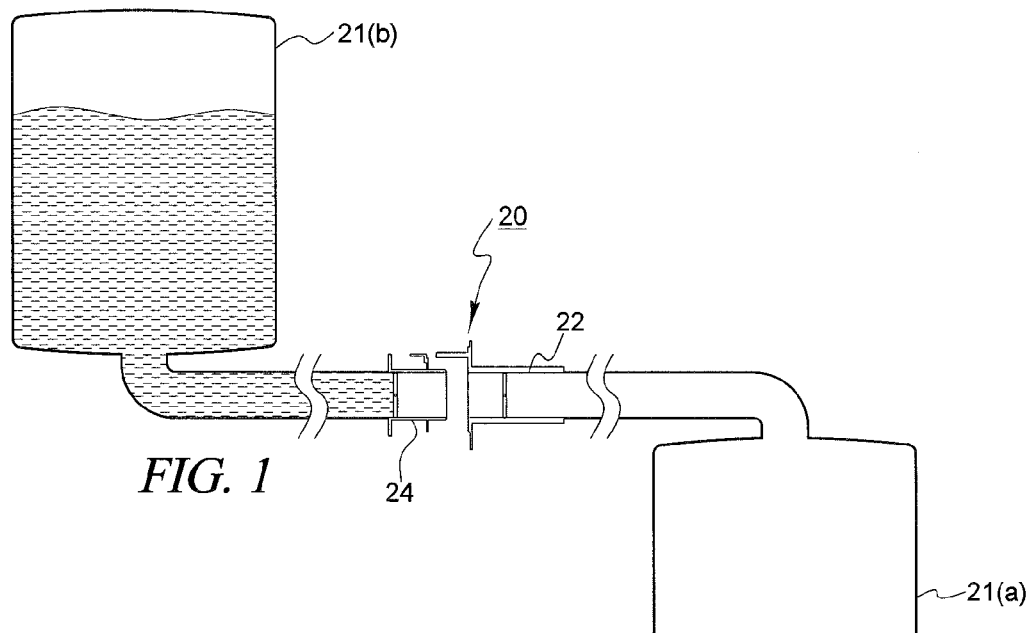
FIG. 1 is a schematic illustrating the self sealing disconnect of the present invention in the disengaged orientation.
Figure 2:
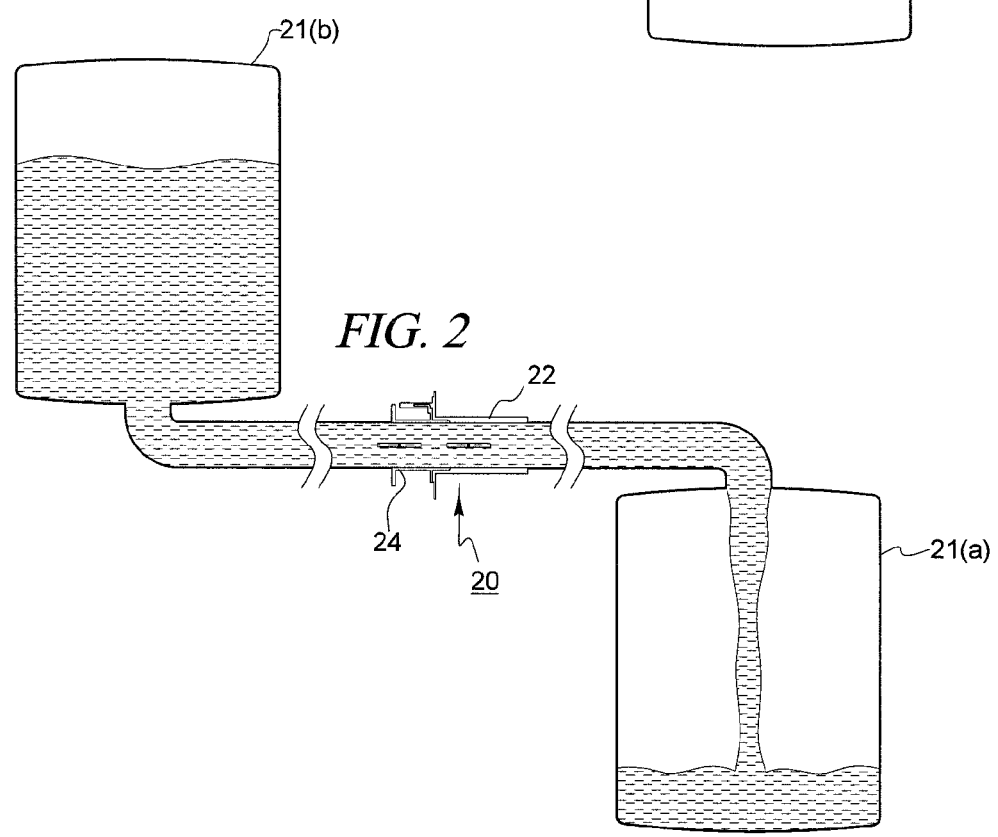
FIG. 2 is a schematic illustrating the self sealing disconnect of the present invention in the engaged orientation.

FIGS. 1 and 2 illustrate one potential application for the disconnect valve 20 of the present invention. Namely, FIGS. 1 and 2 illustrate valve 20 being used to regulate the flow of a fluid between two housings 21(a) and 21(b). When the two halves (22 and 24) of valve 20 are uncoupled (note FIG. 1), flow is prevented and a fluid tight seal is created within each half of the valve (22 and 24). Conversely, coupling the two halves (22 and 24) of valve 20, as noted in FIG. 2, completes a fluid circuit that permits the flow of fluid between the two housings 21(a) and 21(b).

Although valve 20 can be used in a variety of settings, one particular use is in conjunction with the crew launch vehicle of a spacecraft. In this embodiment, the inner half 22 of valve 20 (known as the flight side) is secured within a crew vehicle. In this case, housing 21(a) represents the crew compartment of the spacecraft. The outer half 24 of the valve 20 (known as the ground side) is adapted to be secured to the exterior of the crew vehicle. In this case, housing 21(b) represents a supply of a fluid, such as oxygen or nitrogen, that must be delivered into the crew compartment 21(a) prior to launch. Valve 20 can likewise be used in delivering denser fluids, such as water or fuel, to crew compartment 21(a). This is, however, only one possible application and those skilled in the art will appreciate still yet other applications. If desired, a pivoted linkage and/or a fastener can be used in coupling the flight and ground sides (22 and 24) of valve 20.

Ground Side Connector

Figure 5:
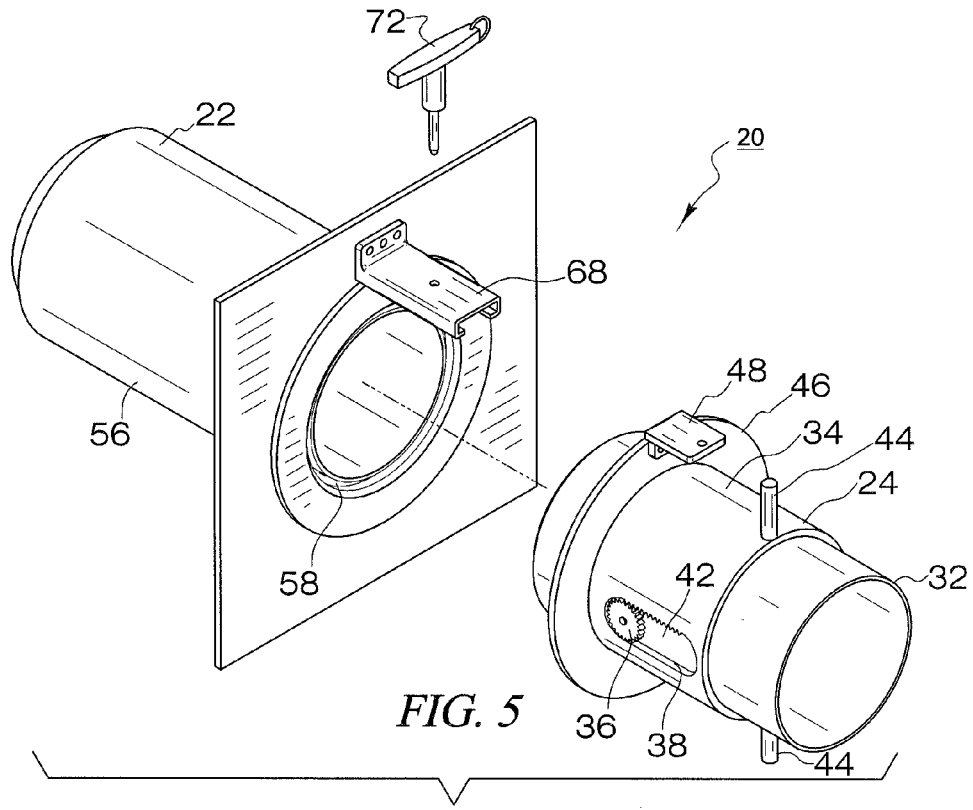
FIG. 5 is a perspective view of the self sealing disconnect valve in the disengaged orientation.

The ground side 24 of disconnect valve 20 is described in connection with FIGS. 3-5. As illustrated, the ground side connector 24 includes an inner (or first) sleeve 32 and an outer (or second) sleeve 34. Sleeves 32 an 34 slide relative to one another. More specifically, inner sleeve 32 slides within outer sleeve 34. As such, the inner sleeve 32 is adapted to carry the flow media. As noted in FIG. 3, a pinion gear 36 is rotatably mounted to inner sleeve 32 via an axle. Pinion 36 rides upon a rack 38 this is formed upon an axial slot 42 within outer sleeve 34. Outer sleeve 34 further includes opposing handles 44 that allow an operator to slide outer sleeve 34 with respect to inner sleeve 32. A peripheral flange 46 and an associated locking clip 48 (note FIG. 5) are included on outer sleeve 34 and serve in locking flight side connector 22 to ground side connector 24 as noted hereinafter.

Figure 6:
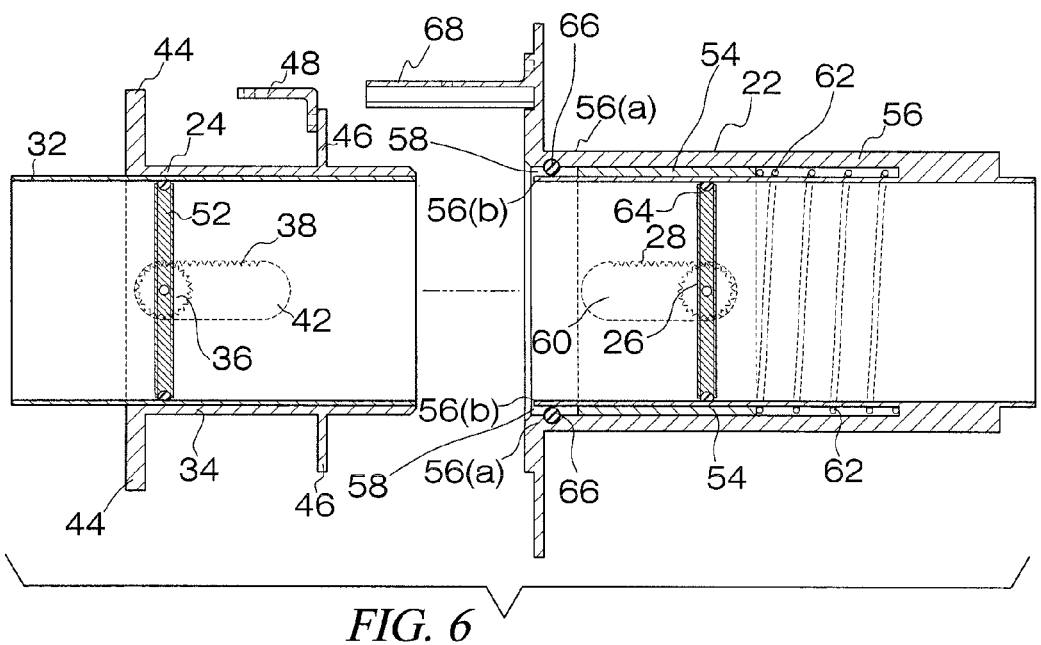
FIG. 6 is a sectional view of the self sealing disconnect valve in the disengaged orientation.

With reference to FIG. 6, the internal butterfly valve 52 of ground side connector 24 is depicted. Butterfly valve 52 is mounted on the same axle as pinion gear 36, such that rotation of gear 36 results in the rotation of valve 52. Thus, the relative movement of the inner and outer sleeves (32 and 34) causes gear 36 to engage rack 38, such that gear 36 rotates. Rotation of gear 36, in turn, causes the rotation of butterfly valve 52. Namely, valve 52 is rotated between opened and closed positions as gear travels between the ends of slot 42. Butterfly valve 52 has a fully closed orientation (FIG. 6), a partially opened orientation (FIG. 7), and a fully opened orientation (FIG. 8). In the closed position, butterfly valve 52 seals against the inner surface of the inner sleeve 32 via contact with an elastomeric seal installed about the periphery of valve 52. This seal slides into a groove in butterfly valve 52 for easy replacement as required.

The ground side connector 24 is normally held in the closed position by a torsion spring attached to the axle of butterfly valve 52. This torsion holds the valve shut and also transmits force via the rack and pinion (38 and 36) to hold outer sleeve 34 in a contracted position (FIG. 6). Operation of valve 20 begins with both connectors (22 and 24) disconnected and closed (FIG. 6).

Flight Side Connector

Flight slide connector 22 is similar in many respects to ground side connector 24. Namely, flight side connector 22 includes inner (or first) sleeve 54 and an outer or second sleeve 56. Sleeves 54 and 56 slide relative to one another. However, unlike the ground side connector 24, the inner sleeve 54 of flight side connector 22 actually rides within a circumferential opening 58 within outer sleeve 56 (note FIGS. 7 and 8). The circumferential opening 58 divides sleeve 56 into outer and inner extents 56(*a*) and 56(*b*). This arrangement also permits inner sleeve 54 to slide back and forth within sleeve 56 with a fixed stroke length. Flight side connector 22 further includes a pinion gear 26 that is interconnected to inner extent 56(*a*) of sleeve 56. Furthermore, pinion gear 26 rides upon, and is rotated by, a rack 28 this is formed upon an axial slot 60 within inner sleeve 54 (FIG. 10).

In the unattached position (i.e. with connectors 22 and 24 uncoupled), inner sleeve 54 is fully extended by a compression spring 62 that is positioned within the base of circumferential opening 58. This force is transmitted to inner sleeve 54 and to the rack and pinion. FIG. 6 illustrates the position of inner sleeve 54 within opening 58 when spring 62 is in the unbiased state.

Flight side connector 22 also includes an internal butterfly valve 64 that is mounted to the pinion gear 26. Thus, the relative movement of the inner and outer sleeves (54 and 56) causes the rotation of gear 26, which, in turn, rotates butterfly valve 64 between opened and closed positions. Thus, depending upon the relative orientation of inner and outer sleeves (54 and 56), valve 64 can have a closed orientation (FIG. 6), a partially opened orientation (FIG. 7), or a fully opened orientation (FIG. 8). In the unattached orientation (note FIG. 6), the force of compression spring 62 keeps butterfly valve 64 in the fully closed orientation.

Mating the Connectors

Mating of connectors is achieved by an operator manually abutting the ground side connector 24 to the flight side connector 22. Thereafter, the operator presses inwardly on handles 44. As a result, the inner most sleeve 32 of ground connector 24 butts up against the inner extent 56(*b*) of sleeve 56 of flight side connector 22. Continued movement of handles 44 causes the outer sleeve 34 of ground connector 24 to enter opening 58 and engage the inner sleeve 54. As outer sleeve 34 enters opening 58, it slides over an o-ring seal 66 on the inner diameter of the outer extent 56(*a*) of sleeve 56. This serves to create a fluid tight seal as fluid flows between the two connector halves (22 and 24). As handles 44 are pressed further, the locking clip 48 of ground connector 24 engages a flange 68 on the flight connector 22, whereby further inward movement is prohibited. In this orientation, inner sleeve 54 of flight side connector 22 is fully retracted and inner sleeve 32 of ground side connector 24 is fully extended (note FIG. 8).

As most clearly illustrated in FIG. 8, when the two halves (22 and 24) are fully engaged, pinions 26 and 36 are positioned so as to fully open associated butterfly valves (52 and 64). Namely, both butterflies (52 and 64) have rotated 90° to fully open positions to permit the free flow of fluid between the ground and flight based housings 21(*a*) and 21(*b*).

Thereafter, as the two halves (22 and 24) are uncoupled, compression spring 62 causes inner sleeve 54 to return to its extended position, which, in turn, causes butterfly 64 to rotate shut.

In one aspect of the present invention, during withdrawal, butterfly valve 64 achieves its fully closed orientation (FIG. 6) prior to sleeve 34 being removed from opening 58. Valve 64 also shuts prior to sleeve 34 losing contact with seal 66. Thus, the fluid tight, sleeve-to-sleeve seal accomplished by o-ring 66 is maintained as valve 64 shuts during withdrawal.

Moreover, as noted in FIG. 6, o-ring 66 is preferably positioned within a space, or gap, that is formed between the end of inner sleeve 54 and the distal end of opening 58. This gap is present even with valve 64 in its closed state. Thus, during insertion, outer sleeve 34 can be positioned within the gap to form a fluid tight seal between two halves (22 and 24) without inner sleeve 54 being engaged or valve 64 otherwise being opened. This ensures that an adequate seal is formed prior to the full fluid circuit being completed.

Locking the Connectors

A variety of mechanisms can be employed to lock the two halves (22 and 24) together. For example, as the mating surfaces of the ground side connector 24 contact the flight slide connector 22, four circumferential and equally spaced ball and spring type detents engage a circular groove in the flight slide connector 22. This engagement would serve to align and retain the two halves of the disconnect 20 together. Pushing on the ground connector 24 would cause these detents to engage. Conversely, pulling on the ground side connector 24 would cause the four detent balls to disengage.

Figure 7:
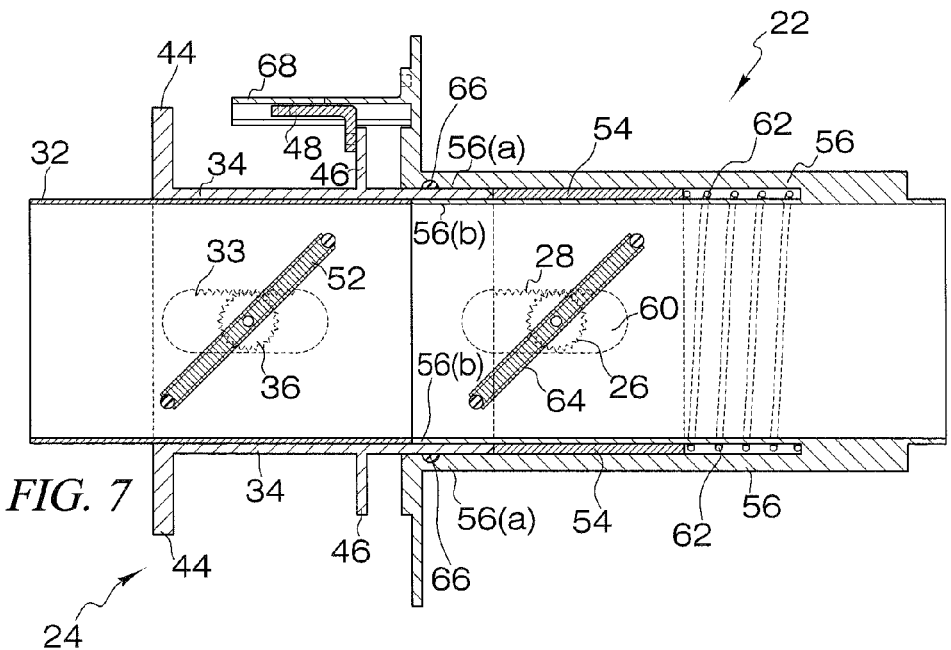
FIG. 7 is a sectional view of the self sealing disconnect valve in the engaged orientation and with the associated valves partially opened.
Figure 8:
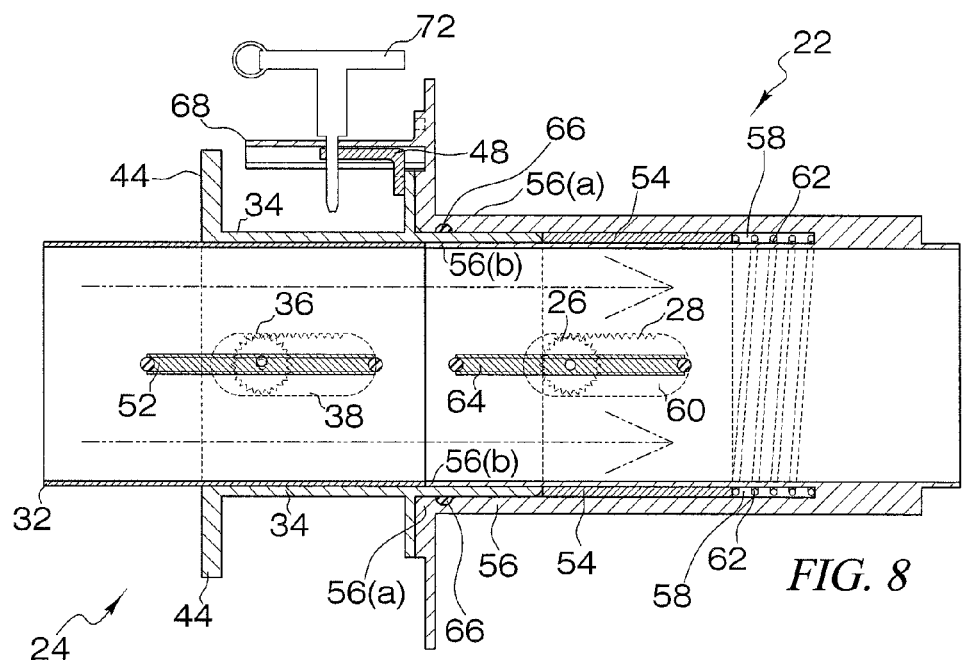
FIG. 8 is a sectional view of the self sealing disconnect valve in the engaged orientation and with the associated valves fully opened.
Figure 11:
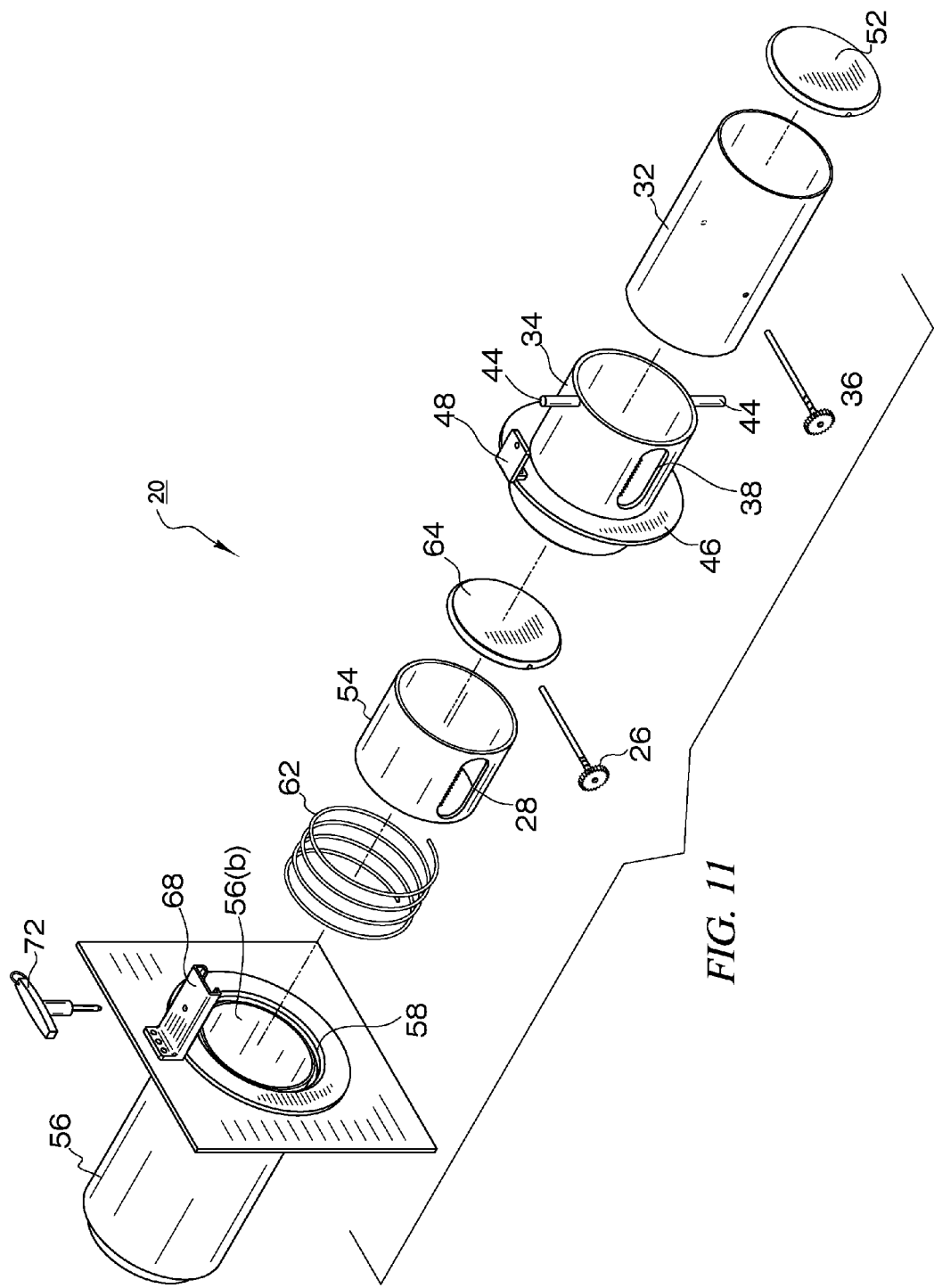
FIG. 11 is an exploded view of the self sealing disconnect valve of the present invention.

In the depicted embodiment, and as noted below, the ground side connector 24 includes locking clip 48 that fits into a slot within tang or flange 68 on flight side connector 22 (FIGS. 6-8). When connectors (22 and 24) are fully engaged, a standard MS detent pin 72 can be inserted into clip 48 to lock it to flange 68 and, thereby, lock the connectors (22 and 24) together. In the alternative, an external clamshell connector can be used to lock the two halves together.

Materials

The sleeves (22 and 24) and butterfly valves (52 and 64) are composed of aircraft grade aluminum tubing, for low weight and anodized for corrosion protection. The locking clip 48 for ground side connector 24 is also aluminum. Each rack and pinion/shaft assembly (26, 28, 36 and 38) is composed of a 300 series stainless steel, for corrosion protection and wear resistance and to otherwise meet the 12,000 cycle requirement, which is the standard for harsh environments. The compression and torsion springs are stainless steel COTS parts. The elastomeric seals are Ethylene Propylene Rubber which exhibits good wear resistance over a wide range of temperatures. The four detents are COTS ball-plunger assemblies, stainless steel. The clamshell locking ring is also COTS.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A multipart valve comprising:
   a male side connector having first and second sleeves that slide with respect to one another, a valve positioned within the first sleeve, the sleeves and valve being interconnected such that relative movement of the first and second sleeves causes the rotation of the valve between open and closed positions;
   a female connector having first and second sleeves, a valve positioned within the second sleeve, the sleeves and valve being interconnected such that the relative movement of the first and second sleeves causes the rotation of the valve between open and closed positions;
   whereby with the female and male connectors engaged both valves are opened and with the female and male connectors disengaged both valves are closed;
   wherein the sleeves and the valve of the male side connector are interconnected via a rack and pinion.

2. The multipart valve as described in claim 1 wherein the rack is formed within the second sleeve, and the pinion gear and valve are rotatably connected to the first sleeve.

3. The multipart valve as described in claim 1 wherein sleeves and valve of the female side connector are interconnected via a rack and pinion.

4. The multipart valve as described in claim 3 wherein the rack of the female side connector is formed within the first sleeve, and the pinion gear and valve of the female side connector are rotatably connected to the second sleeve.

5. The multipart valve as described in claim 1 wherein a peripheral opening is formed within the second sleeve of the female connector.

6. The multipart valve as described in claim 5 wherein the second sleeve of the male connector is inserted into the peripheral opening of the female connector to complete the multipart valve.

7. A multipart valve that can be selectively engaged to complete a fluid circuit, the multipart valve comprising in combination:
   a ground side connector having first and second sleeves that slide with respect to one another, a rack formed within the second sleeve, a pinion gear and butterfly valve rotatably connected to the first sleeve, the pinion gear engaged with the rack such that movement of second sleeve with respect to the first sleeve causes the rotation of the butterfly valve to open and close the ground side connector, a spring biasing the butterfly valve to its closed position;
   a flight side connector having first and second sleeves, a peripheral opening within the second sleeve and dividing the second sleeve into inner and outer extents, the first sleeve being slidably positioned within the peripheral opening, a rack formed within the first sleeve, a pinion gear and butterfly valve rotatably connected to the inner extent of the second sleeve, the pinion gear engaged with the rack such that the movement of the second sleeve with respect to the first sleeve causes the rotation of the butterfly valve to open and close the flight side connector, a spring biasing the butterfly valve to its closed position;
   whereby the ground and flight side connectors can be engaged by inserting the second sleeve of the ground side connector into the peripheral opening of the flight side connector, such insertion resulting in the relative movement of the first and second sleeves of both the ground and flight side connectors and a corresponding rotation of both butterfly valves, the butterfly valves opening to complete the fluid circuit when the ground and flight side connectors are engaged and closing to terminate the fluid circuit when the ground and flight side connectors are disengaged.

* * * * *